United States Patent [19]

White

[11] Patent Number: 5,273,665
[45] Date of Patent: Dec. 28, 1993

[54] WATER FILTRATION DEVICE

[76] Inventor: Theodore B. White, 134 Scottsdale Road, Guelph, Ontario, Canada, N1G 2K8

[21] Appl. No.: 885,816

[22] Filed: May 20, 1992

[51] Int. Cl.⁵ .............................................. C02F 3/06
[52] U.S. Cl. .................................. 210/788; 210/802; 210/414
[58] Field of Search ............... 210/787, 788, 801, 802, 210/521, 150, 151, 414

[56] References Cited

U.S. PATENT DOCUMENTS

| | | | |
|---|---|---|---|
| 3,589,518 | 6/1971 | Brebion | 210/150 |
| 4,088,571 | 5/1978 | Helgesson | 210/150 |
| 4,137,171 | 1/1979 | Yokata | 210/150 |
| 4,172,789 | 10/1979 | Huardeau | 210/522 |
| 5,126,042 | 6/1992 | Malone | 210/151 |

Primary Examiner—Robert A. Dawson
Assistant Examiner—David Reifsnyder
Attorney, Agent, or Firm—R. Craig Armstrong

[57] ABSTRACT

The water filtration apparatus is based on the principles of swirl-separation, flow-straightening and biological filtration. The waste stream is introduced into a swirl chamber. Overflow from the swirl chamber is introduced into a biological chamber in the form of a vertically-oriented tube bundle, where it is straightened, its velocity is reduced and it is allowed to contact a biologically active media. The overflow from the tube bundle is then removed. Underflow is removed from the bottom of the swirl chamber.

1 Claim, 1 Drawing Sheet

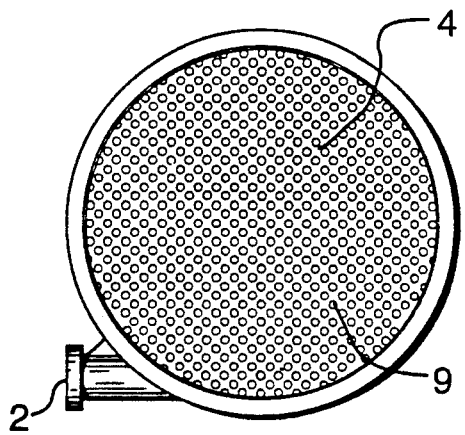
FIG.3.
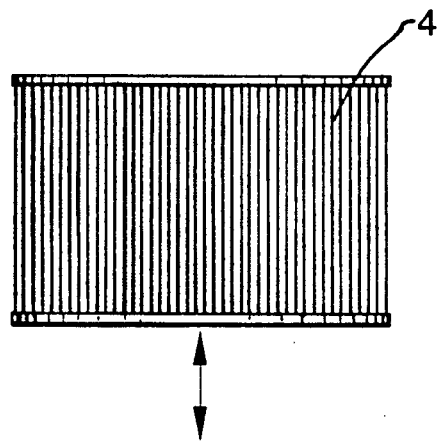
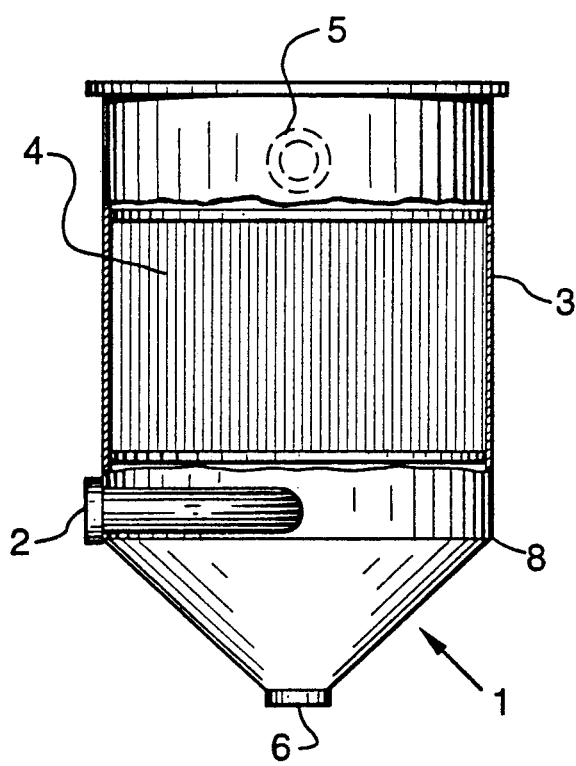
FIG.2.
FIG.1.

WATER FILTRATION DEVICE

BACKGROUND OF THE INVENTION

This invention relates to water treatment and in particular to the recycling or recirculation of used water in aquacultural facilities or other applications.

The invention removes dissolved and solid wastes from water and other fluids. In particular, in the aquacultural application it removes ammonia and other nitrogenous wastes, fecal material and uneaten food from the water. This treatment permits the water to be recycled and/or to meet legislated waste stream discharge criteria.

Many designs exist for filter equipment designed to remove dissolved and solid wastes. Biological filtration, the treatment of wastes by biological processes, is commonly used in filter designs. Plastic, or other materials, forms a media to provide substrata for the colonization of nitrifying bacteria. Submerged media designs suffer from channelling and clogging effects due to solids load and bacterial film sloughing. Trickling designs also suffer from channelling effects and often need to be very large because of the high void fraction of the media typically used. In northern climates, trickling designs are prone to super-chilling, which reduces capacity and freezing. Biological media are usually poor solids removal devices and require considerable operational expense. In addition, clogging and channelling destroys biological capacity and de-rates the filter.

Separation of solids from waste streams is accomplished by several processes and is very common. A common approach, related to this invention, is that of a swirl separator. The waste stream enters the unit and is induced to rotate. An overflow is designed to remove cleaned water in as quiescent a manner as possible. An underflow removes concentrated wastes. A major design problem is to achieve low velocities at the overflow to reduce transport of solids. Typical values are on the order of 90 cm/sec. In practice, these units rarely remove more than 70% of the solids in a typical waste stream. This, by itself, is unacceptable for water reuse, and an additional filter, usually a screen or sand filter, must be added.

A major problem with current technology is that several individual pieces of equipment are required to achieve the full desired effect. Typical swirl separators only remove solids and cannot treat dissolved wastes. Typical biological filters only remove dissolved waste and are sensitive to solids loading. It is difficult to optimize the overall design of the waste treatment system as the individual components are usually not well matched in performance and often come from several sources. Multiple units increase complexity, capital and operational expense and the tendency to failure of the system. In addition, most solids removal designs require periodic backflushing or other cleaning and cannot operate continuously unless equipped with automatic controls. Backflushing and cleaning of biological media is disruptive to the bacteria and de-rates the filter unit.

SUMMARY OF THE INVENTION

This invention is based on the principles of swirl-separation, flow-straightening and biological filtration. The waste stream is introduced into a swirl chamber. Overflow from the swirl chamber is introduced into a biological chamber where it is straightened, its velocity is reduced and it is allowed to contact a biologically active media. The overflow is then removed above the biological chamber. Underflow is removed from the bottom of the swirl chamber.

The unit has been developed for new installations and as a retrofit recirculation system for existing tank installations. Primary advantages of the design are simplicity of operation, minimum maintenance, minimum modification of conventional hatchery practice, low capital cost and low operational cost.

It is anticipated that water usage can be reduced by up to 95% depending on the specific application. The unit uses swirl separation as the primary solids removal technique. With proper installation, i.e. tank drains with minimum number of turbulence-inducing elbows, etc., 80% to 95% of the solids can be removed in a single pass. It should be noted that double standpipes and in-tank sumps are unnecessary to achieve this performance level.

Replacement of existing tanks and/or extensive modification is not required. Any conventional tank design can be used with this system. Typically, installation involves inserting the unit between the existing tank and external standpipe. No modification of the existing water supply is required.

Biological filtration is accomplished by a packed media canister which is removable. Removing the canister allows for simple cleaning or servicing and permits biologically active media to be transferred from tank to tank. Fish and their filter media can be transferred as required. Problems associated with biofilter conditioning times are therefore greatly reduced. A removable biologically active media simplifies disease treatment procedures by eliminating the risk of killing the all-important nitrifying bacteria.

BRIEF DESCRIPTION OF THE DRAWINGS

The invention will now be described in detail, with reference to the accompanying drawings of the preferred embodiment. In the drawings:

FIG. 1 is a first side elevation of the preferred embodiment;

FIG. 2 is a side elevation view at 90 degrees to FIG. 1; and

FIG. 3 is a top view.

DETAILED DESCRIPTION OF THE PREFERRED EMBODIMENT

The preferred embodiment of the invention will now be described, as an example of the filter produced according to the invention.

This invention removes solid and dissolved material on a continuous basis from fluid waste streams.

The base of the invention consists of a conical bottomed chamber 1 into which the waste stream is introduced via a tangential inlet 2 to permit it to rotate. This is referred to as the swirl chamber. Above the conical chamber is a cylindrical chamber 3 which contains a bundle of small vertically oriented tubes 4 bonded together and completely filling the diameter of the chamber. This is referred to as the biofilter chamber. The overflow water rises through the tube bundle which act as a flow straightener and causes the water velocity to be equal in all tubes. The tube bundle provides surface area for the colonization of nitrifying bacteria. Overflow fluid is withdrawn from an outlet 5 above the tube bundle. The underflow fluid departs from the bottom outlet 6 of the conical chamber. The underflow contains concentrated solids and the overflow is the treated or cleaned fluid.

The cone angle can vary over a wide range but better performance is obtained with steeper angles. A practical compromise appears to be 45 degrees.

In the current design, the inlet 2 is arranged to be immediately above the joint 8 between the cone and cylinder sections. The diameter of the inlet 2 is a function of the inlet flow rate and the desired angular velocity of the fluid in the portion of the invention below the tube bundle. These factors can vary over a wide range depending on the character of the waste stream. The current design uses an angular velocity in the range of 0.2 to 0.5 radians/second.

The diameter of the cylindrical chamber 3 is a function of the inlet flow rate, the character of the waste solids and the desired separation efficiency. The current design uses an upwelling velocity of 1.5 centimeters/second or less for treating aquacultural wastes. This can also vary over a wide range for treating a range of waste streams.

The diameter of the individual tubes 9 in the tube bundle 4 is a function of the desired particle removal size, the particle density, the upwelling velocity and the required surface area for nitrification. The current design uses a tube diameter of 8 millimeters. Tube diameter can also vary over a wide range. Tubes can also be any cross-sectional shape, including round, square, hexagonal, etc.. The tubes can be bonded together or loose-packed and the bundle is best arranged to be removable for maintenance and to permit biologically active bundles to be moved from unit to unit, by containing the tubes in a basket or other container.

The length of the tube bundle and therefore the length of the cylindrical chamber is a function of the desired surface area for nitrifying bacterial colonization.

As a specific example of the invention, one embodiment has the following specifications:

| | | |
|---|---|---|
| Biomass load | 200 | kg |
| Water level height | 1.02 | meters |
| Tank freeboard | 0.15 | meters |
| Return pipe diameter | 0.08 | meters |
| Overflow pipe diameter | 0.05 | meters |
| Airlift diameter | 0.10 | meters |
| Filter diameter | 0.77 | meters |
| Filter height | 1.28 | meters |
| Filter mass (empty) | 43.4 | kg. |
| Minimum raw water flow | 4.0 | l/min. |
| Maximum air flow | 76.0 | l/min. |
| Carrying rate | 50 | kg/liters/min. |
| Bottom separator | 159 | microns |
| Effective recylcling | 96% | |
| Oxygen resaturation | 92% | |

Table 1 shows typical solids removal data. Solids removal data was measured by filtering a known volume (approximately 1 liter) of water using Watman glass fibre filters in a Millipore filter apparatus and drying the residue at 55 deg C. for 2 hours. Recirculation level is expressed as follows:

$$\% \text{ Recirculation} = \frac{\text{Overflow rate}}{(\text{Underflow rate} + \text{Overflow rate})}$$

TABLE 1

| Recirc level | Solids Removal Data | | | | | |
|---|---|---|---|---|---|---|
| | 99% | 83% | 82% | 79% | 77% | |
| Underflow | 67 | 16.28 | 13.18 | 4.26 | 2.5 | mg/l |
| | 0.21 | 2.34 | 2.27 | 2.36 | 3.61 | l/min |
| Make-up | 0.57 | 0.3 | 0.1 | 0.1 | 0.4 | mg/l |

TABLE 1-continued

| Recirc level | Solids Removal Data | | | | | |
|---|---|---|---|---|---|---|
| | 99% | 83% | 82% | 79% | 77% | |
| Overflow | 0.21 | 2.34 | 2.27 | 2.36 | 3.61 | l/min |
| | 5.7 | 0.29 | 0.1 | 0.19 | 0.1 | mg/l |
| | 15.28 | 11.49 | 10.07 | 8.62 | 11.77 | l/min |

Table 2 shows typical ammonia removal data. Ammonia level was measured as total ammonia ($NH_4$—N) removed between filter inlet and overflow.

TABLE 2

| Ammonia Removal Data | | | | | | |
|---|---|---|---|---|---|---|
| Inlet conc. | 0.25 | 0.21 | 0.13 | 0.23 | 0.08 | mg/l |
| Single pass | 56% | 35% | 43% | 50% | 21% | |

It will be appreciated that many variations on the above are possible, as will be obvious to those knowledgeable in the field of the invention, and such variations are considered to be within the scope of the invention as defined by the accompanying claims, whether or not expressly described herein.

For example, the current design uses a circular cone and cylinder for the swirl chamber and the biological chamber. Other shapes such as involute, elliptical, etc., may be used.

The current design is constructed entirely of plastics but may be made from a variety of materials.

A screen may be installed across the top and/or bottom of the tube bundle to improve performance. These screens can be of any pore size depending on the waste stream to be treated.

Flotation may be installed attached to the tube bundle to permit easier cleaning and removal.

The inlet diameter may vary in size and the angle at which it is introduced into the swirl chamber may also vary. Also the inlet location can vary along the vertical axis of the unit.

At the inlet, a transitional inlet section may be installed to expand or contract the inlet diameter before introduction into the swirl chamber. The purpose of this variation is to match the inlet stream velocity with the desired angular velocity of water rotation within the swirl chamber.

A very short tube bundle may be used in situations where biological filtration is not desired. The unit, in this case, then operates as an improved swirl separator only.

What is claimed as the invention is:

1. A method of filtering water, comprising the steps of:
    (a) passing the water tangentially into the base of a cylindrical swirl chamber through an inlet pipe, the swirl chamber and inlet pipe being relatively sized such that the water rotates in the swirl chamber at between 0.2 and 0.5 radians/second, the swirl chamber having mounted above it a bundle of open-ended tubes extending vertically upwardly, the bottom ends of the tubes extending in a plane defining the top of the swirl chamber, the top ends of the tubes being in flow communication with an upper chamber, the bottom of the swirl chamber being open for flow communication with an upper large end of a conical chamber;
    (b) draining waste water through a first outlet pipe connected to the small end of the conical chamber at a rate consistent with the remainder of the water moving upwardly through the tubes at a maximum velocity of approximately 1.5 centimeters per second; and
    (c) collecting filtered water through a second outlet pipe connected to the upper chamber.

* * * * *